United States Patent [19]

Hayman

[11] Patent Number: 4,681,140

[45] Date of Patent: Jul. 21, 1987

[54] TUB-SHOWER DIVERTER APPARATUS

[75] Inventor: Dennis J. Hayman, Plano, Tex.

[73] Assignee: United States Brass Corporation, Fort Worth, Tex.

[21] Appl. No.: 935,511

[22] Filed: Nov. 26, 1986

[51] Int. Cl.⁴ .......................... F16K 7/12; F16K 11/20
[52] U.S. Cl. .................................... 137/597; 137/613; 137/625.4; 137/863; 137/867
[58] Field of Search ................ 137/597, 625.4, 625.41, 137/860, 862, 863, 867, 613

[56] References Cited

U.S. PATENT DOCUMENTS

| | | | |
|---|---|---|---|
| 3,232,308 | 2/1966 | Moen | 137/597 X |
| 3,612,104 | 10/1971 | Busquets | 137/597 |
| 3,756,276 | 9/1973 | Katva | 137/597 |

Primary Examiner—A. Michael Chambers
Assistant Examiner—John C. Fox
Attorney, Agent, or Firm—Wm. T. Wofford; James C. Fails; Arthur F. Zobal

[57] ABSTRACT

There is disclosed tub-shower diverter apparatus that includes a diverter chamber having a planar annular surface that is pierced by a first opening or openings to provide communication with an inlet water supply, and is further pierced by second and third oppositely disposed openings or series of openings that communicate respectively with a tub outlet and a shower outlet. The second and third openings are centered on a diameter of the planar annular surface and are spaced radially from the first opening. Diverter seal means disposed within the diverter chamber is an elastomeric washer sized to overlay the second and third openings, but not the first opening. A diverter cam underlies a portion of the elastomeric washer to prevent that portion from engaging the diverter chamber planar annular surface. Rotation of the cam permits selection of the portion of the elastomeric washer that will not be engaged with the diverter chamber planar annular surface. Pressure of water from the inlet supply will force the elastomeric washer into sealing engagement with the diverter chamber planar surface except where prevented by the cam. The cam can be positioned to selectively permit water flow to the tub or to the shower, or to neither. Additional aspects of the invention are also disclosed.

9 Claims, 4 Drawing Figures

TUB-SHOWER DIVERTER APPARATUS

FIELD OF INVENTION

The invention relates to improved tub-shower diverter apparatus.

DESCRIPTION OF THE PRIOR ART

It is common practice to provide a single valve arrangement for controlling the supply of water for a tub-shower bath installation and to provide means for selectively directing the water supply to either the tub or the shower. Such arrangement avoids the necessity for separate valves for the tub and shower, with resulting economy. Traditionally, the most common installation has provided separate hot and cold water valves at the tub and a diverter device located in the tub filler spout. Another type of installation utilizes a single handle valve located above the tub within convenient reach of a tub bather, which valve functions to turn the water supply on or off and to provide selectable hot-cold mix, but does not provide water volume control. This type of installation utilizes a separate diverter device which is usually incorporated in the tub filler spout. The prior art installations exemplified by those above mentioned have not proved to be entirely satisfactory.

It the objective of the present invention to provide improved tub-shower diverter apparatus, particularly in installations that will utilize a single handle valve.

SUMMARY OF THE INVENTION

The invention provides an improved tub-shower diverter apparatus. A diverter chamber includes a planar annular surface that is pierced by first opening means that communicates with an inlet water supply, and by second and third oppositely disposed opening means that communicate respectively with a tub outlet and a shower outlet. The second and third opening means are centered on a diameter of the planar annular surface, and are spaced radially from the first opening means. Diverter seal means disposed within the diverter chamber is an elastomeric washer sized to overlay the second and third opening means but not the first opening means. Diverter cam means is made up of a cam portion and a stem portion, with the cam portion being disposed within the diverter chamber and underlying a portion of the elastomeric washer to prevent that portion from engaging the diverter chamber planar annular surface. Rotation of the cam means stem portion permits selection of the portion of the elastomeric washer that will not be engaged with the diverter chamber planar annular surface. Means, for example a lever, are provided for controlling the rotational position of the cam means stem portion. Pressure of water that is admitted to the diverter chamber from the inlet supply will force the elastomeric washer into sealing engagement with the diverter chamber planar annular surface except where prevented by the cam means cam portion. Thus, either one or both of the second and third opening means may be selectively sealed so that water may be supplied to the tub outlet, the shower outlet, or to neither one.

In a preferred embodiment, the invention is applied to a tub-shower single handle mixing valve which includes a rotatable mixing control stem and the diverter cam means stem portion is concentric with the mixing control stem and is disposed exteriorly of the mixing control stem. Further, in a preferred embodiment, each of the second and third opening means includes a plurality of openings any number of which may be selectively opened or closed by the positioning of the cam means cam portion relative to the elastomeric washer, thereby to control the volume of water flow to the tub or shower. The diverter chamber second and third opening means are preferably disposed radially outwardly of the first opening means.

Further aspects of the invention reside in specific structure and structure relationships which are hereinafter described.

DESCRIPTION OF PREFERRED EMBODIMENTS

Figure 2:
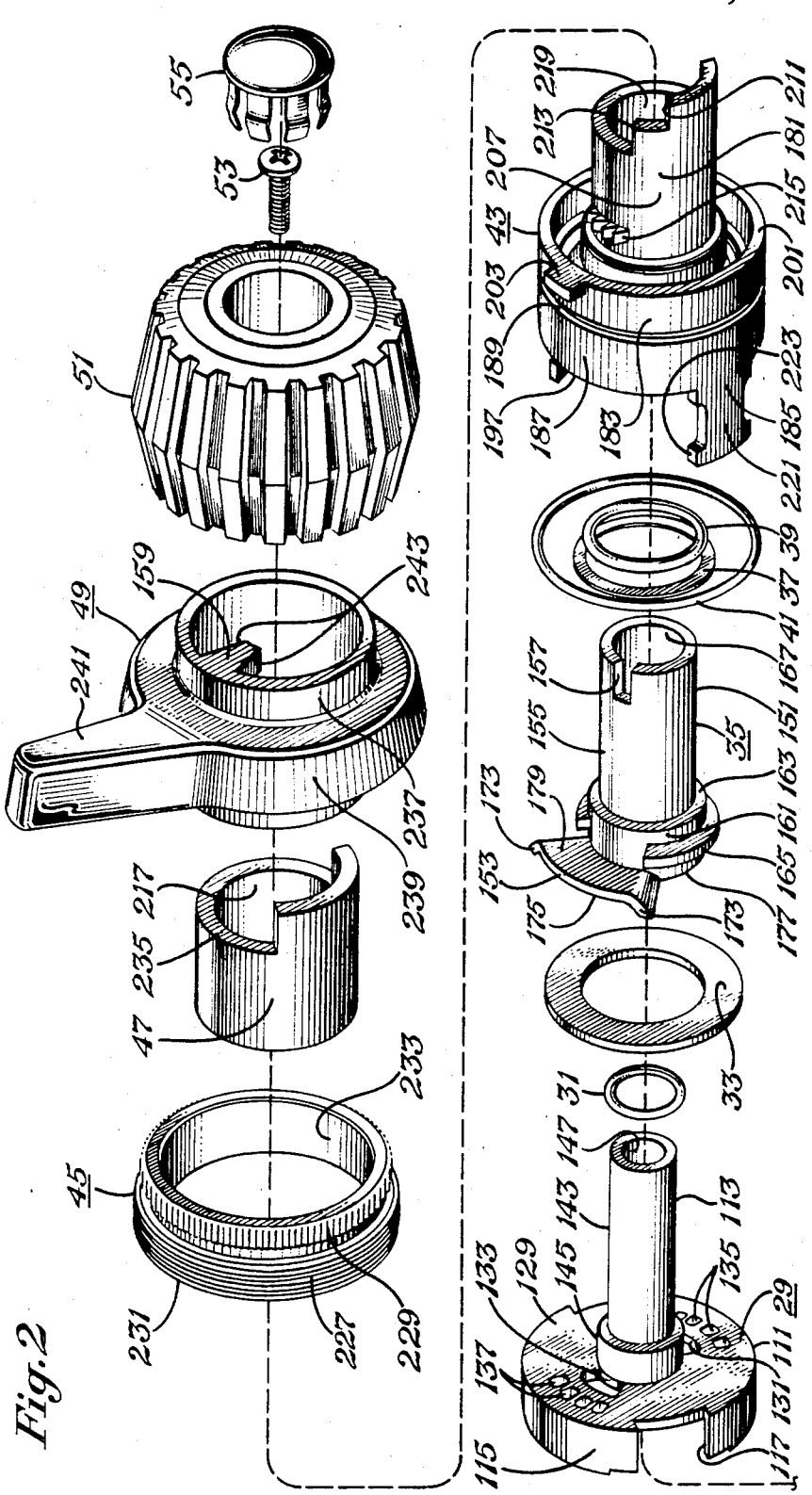
FIGS. 2 and 2A taken together make up an exploded view showing the various parts of the valve of FIG. 1.
Figure 2A:
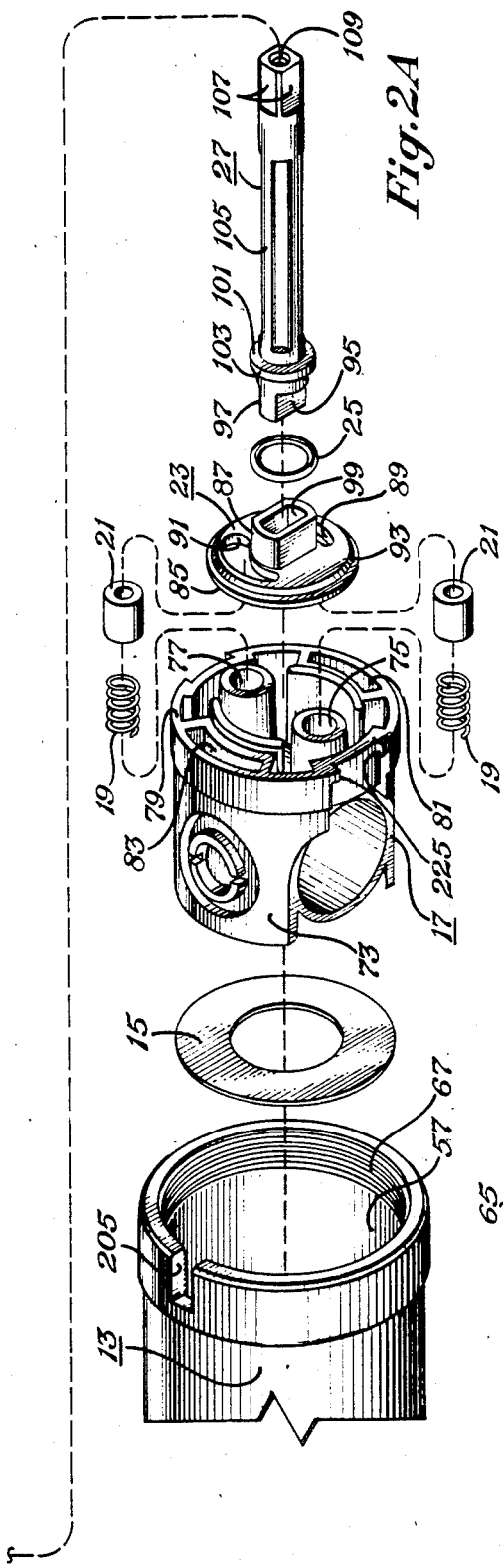

In the preferred embodiment herein described and shown in the drawings, the invention is incorporated into a tub-shower single handle mixing valve 11. The tub-shower single handle mixing valve 11 as best shown in FIGS. 2 and 2A includes a valve body 13, a gasket 15, a seal adapter 17, inlet seal springs 19, inlet seals 21, a control disc 23, a control stem o-ring 25, a control stem 27, a bearing member 29, a bearing member o-ring 31, a diverter seal 33, a diverter cam member 35, a diverter cam member washer 37, a diverter cam member o-ring 39, a retainer member o-ring 41, a retainer member 43, a clamp ring 45, a maximum temperature stop 47, a diverter lever 49, a handle 51, a handle retainer screw 53, and a handle plug button 55.

U.S. Pat. No. 4,397,330, which is owned by the assignee of the present invention, shows and describes a tub-shower single handle mixing valve which is similar to the one shown and described herein although it does not embody the improved tub-shower diverter apparatus of the present invention. The disclosure of U.S. Pat. No. 4,397,330 is incorporated by reference into this disclosure.

Figure 3:
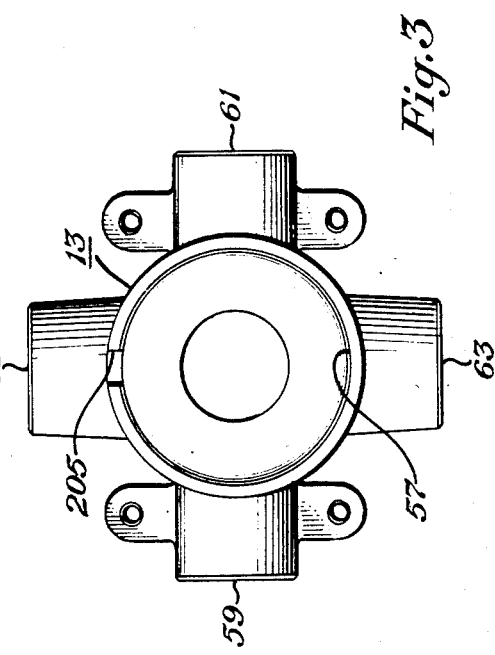
FIG. 3 is a schematic top plan view showing the body portion of the valve of FIG. 1.

The valve body 13 has a generally cylindrical central bore 57 that receives various valve parts. Hot and cold water inlets 59, 61 communicating with the central bore 57 are provided at the inner end region of the valve body in a diametrically opposed fashion (see FIG. 3). Diametrically opposed tub and shower outlets 63, 65, which are displaced 90° from the hot and cold water inlets 59, 61, also communicate with the central bore 57. The central bore has internal threads 67 at its outer end region for matingly engaging external threads 227 of the clamp ring 45. The exterior surface of the outer end region of the valve body is cylindrical for receiving a decorative sleeve (not shown) which in turn receives an escutcheon (not shown).

The generally cylindrical seal adapter 17 has an exterior surface 73 that is received by the valve body central bore 57. The seal adapter also has counterbores 75, 77 at its outward end region for receiving the inlet seal springs 19 and the inlet seals 21. The respective counterbores 75, 77 communicate with the respective hot and cold water inlets 59, 61 when the seal adapter 17 is installed into the valve body central bore 57. Outlet passages 81, 83 open to a planar outward end surface 79 and extend to the tub-shower outlets 63, 65 when the seal adapter 17 is installed into the valve body 13.

The control disc 23 has a planar inward surface 85 and a central outward extending hub 87. Conventional oppositely disposed generally kidney-shaped control openings 89, 91 in the control disc provide for a desired hot-cold water mixing action. Around the perimeter of the control disc 23 is an annular bearing surface 93. The generally cylindrical control stem 27 is provided, at its inward end portion, with flat surfaces 95, 97 of unequal chordal length. The control stem inward end portion matingly engages the inner portion 99 of the control disc hub 87. The control stem flat surfaces 95, 97 are of unequal chordal length so that in assembly, the control disc 23 will be properly oriented with respect to the control stem 27. The control stem 27 has a flange portion 101 adjacent and outward of the inner end. The control stem 27 has a first cylindrical exterior surface 103 around the perimeter of the flange portion 101 and a second cylindrical exterior surface 105 outward of the flange portion. The outward end of the control stem 27 has four flat surfaces 107, disposed to make up a generally square shape. The control stem has a threaded bore 109 opening at its outward end to receive the handle retainer screw 53.

The bearing member 29 includes a base portion 111 and a stem portion 113. The base portion 111 is generally disc-shaped and has a first cylindrical exterior surface 115 with notches 117 that receive the retainer legs 221. The base portion 111 is sized so that the first cylindrical exterior surface 115 will mate with the valve body central bore 57. The base portion 111 has a cavity 119 which opens at its inner end to a first planar bearing surface 121. The planar bearing surface 121 is formed by a first counterbore which opens at its inner end to a second planar bearing surface 123 which is also the inward face of the bearing member 29. The cavity 119 opens at its outer end to a second counterbore which forms a third planar bearing surface 125 and a first cylindrical interior surface 127 for receiving the control stem flange portion 101. A planar annular surface 129 forms the outward surface of the base portion. Oppositely disposed first and second openings 131, 133 pierce the planar annular surface 129 to the cavity 119. A first series and second series of openings 135, 137, disposed radially outward from the first and second openings 131, 133, also pierce the planar annular surface 129 and through respective passageways 139, 141, open to the second planar bearing surface 123 so as to communicate with respective tub and shower outlet openings 63, 65. The first series and second series of openings 135, 137 each comprise a plurality of openings disposed arcuately along a constant radius. The first and second openings 131, 133 and the first and second series of openings 135, 137 are centered on a diameter of the planar annular surface 129. The bearing member stem portion 113 is integral with the base portion 111 and has a second cylindrical exterior surface 143 which merges with a third cylindrical exterior surface 145 of greater diameter which in turn merges with the planar annular surface 129 of the base portion 111. The bearing member 29 has a central bore with a second cylindrical interior surface 147.

The diverter cam member 35 includes a diverter stem portion 151 and a cam portion 153. The diverter stem portion 151 has a first cylindrical exterior surface 155 with a notch 157 in the outward end for receiving the end portion of the diverter lever stop 159. A second cylindrical exterior surface 161 of larger diameter than the first cylindrical exterior surface 155 lies inward of the first cylindrical exterior surface. The first cylindrical exterior surface 155 merges with a shoulder 163 which in turn merges with the second cylindrical exterior surface 161. A radially extending flange portion 165 partially encompasses the perimeter of the second cylindrical exterior surface 161, leaving a gap in the flange portion. The diverter stem portion 151 has a central bore with a first cylindrical interior surface 167. A counterbore forms a second cylindrical interior surface 171 inward of the first cylindrical interior surface 167. The respective diverter stem portion interior surfaces 167, 171 are sized to matingly engage the respective cylindrical exterior surfaces 143, 145 of the bearing member stem portion 113. Inward of the gap in flange portion 165 and longitudinally aligned with the diverter stem portion notch 157, is the cam portion 153, which is integral with the diverter stem portion 151. The cam portion 153 extends radially outward from the second cylindrical exterior surface 161 and subtends a circumferential arc of 90°. The end portions 173 of the cam portion 153 taper inwardly to the inward end of the diverter stem portion 151. The cam portion has an inward surface 175 that is displaced outwardly of the diverter stem portion inward planar end surface 177. The outward surface 179 of the cam portion 153 is disposed inwardly of the diverter stem portion flange portion 165. The diverter stem portion inward end surface 177 merges with the cam portion inward surface 175 at the end portions 173 of the cam portion thereby creating a notch in the diverter stem portion inward end surface. The diverter seal 33 is an elastomeric washer that rims the inward end portion of the diverter stem portion 151 and overlies the cam portion outward surface 179. The diverter seal 33 is sized to overlay the first and second series of openings 135, 137, but not the first and second openings 131, 133 of the bearing member 29.

The retainer member 43 has an upper portion 181, an intermediate portion 183, and a lower portion 185. The intermediate portion 183 has a cylindrical exterior surface 187 sized to matingly engage the valve body central bore 57. The cylindrical exterior surface 187 has a peripheral groove 189 for receiving the retainer member o-ring 41. The intermediate portion 183 has a cavity 191 forming a first planar bearing surface 193. The cavity 191 opens to a shoulder surface which is formed by a first counterbore. A first cylindrical interior surface 195 is formed by the first counterbore that opens to a second planar bearing surface 197 which is also the inward face of the intermediate portion 183. A second cylindrical interior surface 199 is formed by a second counterbore. The outward end of the retainer member 43 has a reentrant portion that opens to a third planar bearing surface 201. A key lug 203 protrudes radially outward from the intermediate portion first cylindrical exterior surface 187 and mates with a slot 205 in the valve body 13. The retainer member upper portion 181 has a cylindrical exterior surface 207 to matingly engage the central bore 217 of the maximum temperature stop 47. The outward end of the retainer member upper portion is notched to provide valve open and valve closed stop surfaces 211. Inward of the valve open and closed stop surfaces 211 are tub open and shower open stop surfaces 213 which are 150° apart. Formed on the upper portion cylindrical exterior surface 207 and projecting radially outward are a series of splines 215 sized to mate with a series of corresponding slots (not shown) disposed in the central bore 217 of the maximum temperature stop 47. The retainer member upper portion 181 has a central bore 219 forming a third cylindrical interior surface. The lower portion 185 of the retainer member 43 forms a pair of generally rectangular depending legs 221, each of which has a pair of notches forming small protuberances 223 that engage lips 225 formed on the exterior of the seal adapter 17.

The clamp ring 45 has external threads 227 which mate with internal threads 67 in the valve body central bore 57 and knurls 229 disposed outwardly of the external threads. The clamp ring 45 has a planar inward bearing surface 231 and a central bore 233.

The maximum temperature stop 47 and the handle 51 are as shown and described in U.S. Pat. No. 4,397,330 hereinabove mentioned, except that the outward end portion of the maximum temperature stop 47 has been notched more deeply to accomodate the diverter lever stop 159 which extends over the maximum temperature stop outward surface 235.

The diverter lever 49 has a cylindrical hub 237 sized to matingly engage the maximum temperature stop 47. A decorative flange 239 extends radially outward with an integral lever 241 extending even further outwardly. Aligned with the lever 241 and extending radially inward is a wedge-shaped stop 159 having tub open and shower open stop surfaces 243 that are 30° apart.

To assemble the valve 11, a sub-assembly composed of the seal adapter 17, the control disc 23, the control stem 27, the bearing member 29, the diverter cam member 35, and the retainer member 43 is made up and is then inserted into the valve body central bore 57. To make up the sub-assembly, the inlet seal springs 19 and the inlet seals 21 are inserted into the seal adapter counterbores 75, 77. Then, the control stem o-ring 25 is installed on the control stem inward end portion against the flange portion 101 and the control stem 27 inserted into the control disc hub inner portion 99. The control disc 23 is placed onto the inlet seals 21 so that the control disc inward surface 85 contacts the inlet seals. Next, the bearing member o-ring 31 is installed onto the bearing member second cylindrical exterior surface 143 and the bearing member 29 is installed onto the control stem 27 such that the control stem first and second cylindrical exterior surfaces 103, 105 matingly engage the bearing member first and second cylindrical interior surfaces 127, 147 respectively. Then, the diverter member washer 37 is installed on the diverter cam member flange portion 165, the diverter cam member o-ring 39 is installed on the diverter cam member shoulder 163, and the diverter seal 33 is installed onto the outward surface 179 of the diverter cam member cam portion 153 and around the diverter cam member stem portion second cylindrical exterior surface 161 near the diverter stem portion inward end surface 177. The diverter cam member 35 is assembled onto the bearing member 29 such that the bearing member second and third cylindrical exterior surfaces 143, 145 matingly engage the diverter cam member first and second cylindrical interior surfaces 167, 171 respectively. The retainer member o-ring 41 is installed into the retainer member peripheral groove 189 and the retainer member 43 is assembled onto the diverter cam member 35 such that the diverter cam member first cylindrical exterior surface 155 and portions of the second cylindrical exterior surface 161 matingly engage the retainer member third cylindrical interior surface 219 and portions of the second cylindrical interior surface 199 respectively and the retainer member legs 221 descend to the bearing member notches 117 and engage the seal adapter locking lips 225. As the retainer member 43 is locked onto the seal adapter 17, the bearing member second bearing surface 123, which is its inward face, bears on the seal adapter outward end surface 79, the retainer member second planar bearing surface 197, which is its inward face, bears on the bearing member planar annular surface 129, and the diverter cam member washer 37 bears on the retainer member first planar bearing surface 193. The inlet seals 21 are urged into contact with the control disc inward surface 85 by the force of the inlet seal springs 19. The gasket 15 is inserted into the valve body central bore 57, followed by the retainer member-seal adapter assembly. The seal adapter 17 contacts the gasket 15 and a valve body cylindrical interior surface, as formed by the central bore 57, matingly receives the retainer member first cylindrical exterior surface 187. The seal adapter 17 has conventional seal assemblies (not shown) that coact with the valve body hot and cold water inlets 59, 61 to provide a seal around those inlets. O-rings 84 provide seals between the seal adapter 17 and the valve body 13 at their respective tub and shower outlets. The clamp ring 45 is threaded into the valve body so that its inward bearing surface 231 engages the retainer member third planar bearing surface 201. Next, the maximum temperature stop 47 is installed onto the retainer member upper portion 181 with the central bore 217 being matingly received by the retainer member second cylindrical exterior surface 207, and with the retainer member splines 215 receiving corresponding maximum temperature stop slots (not shown) which are disposed in the central bore 217. Next, the diverter lever 49 is assembled onto the maximum temperature stop 47 so that the diverter lever stop 159 extends over the maximum temperature stop outward surface 235 and the retainer member upper portion 181 to engage the diverter cam member notch 157. The handle 51 is installed on the control stem 27 and the retainer screw 53 and plug button 55 are installed. The foregoing assembly procedure serves to explain the relationship of the various parts and is exemplary only, and may be varied in actual practice to achieve maximum convenience and efficiency.

Figure 1:
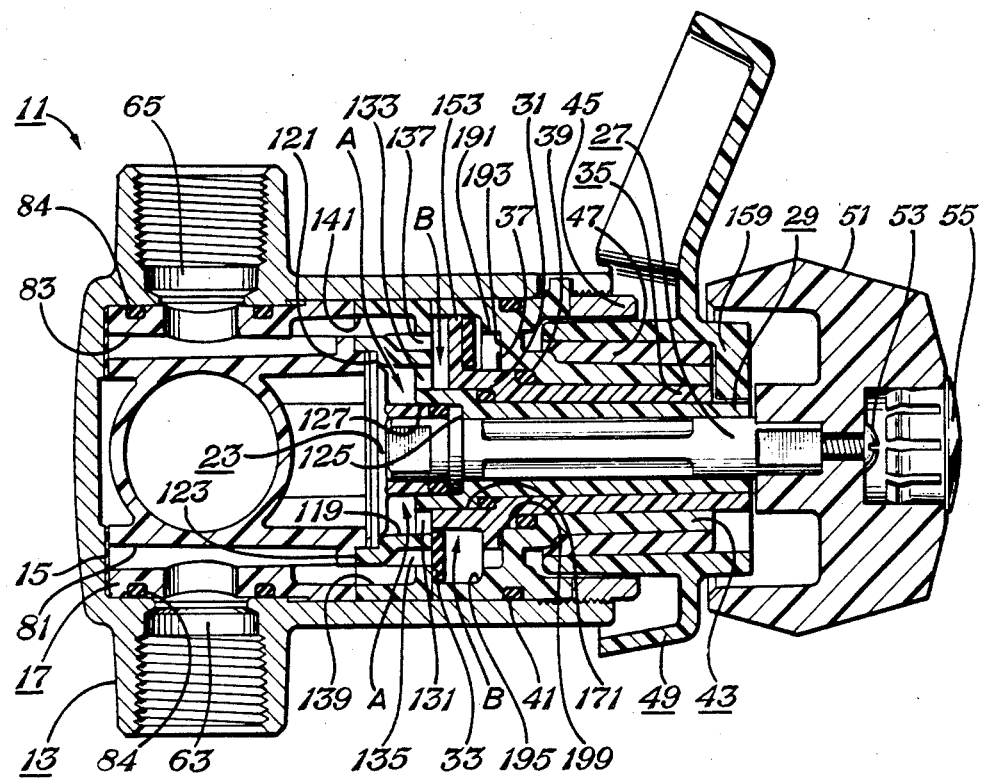
FIG. 1 is a schematic longitudinal section view showing a single handle tub-shower valve incorporating a diverter in accordance with a preferred embodiment of the invention.

When the tub-shower single handle mixing valve of the present invention is assembled, the valve body hot and cold water inlets 59, 61 communicate with the hot and cold water inlet seals 21 which open to a mixing chamber A having wall surfaces including the surfaces of the bearing member cavity 119 and the outward and hub surfaces of the control disc 23 (see FIG. 1). The mixing chamber A communicates via the first and second openings 131, 133 with a diverter chamber B which comprises portions of the bearing member planar annular surface 129 and the bearing member third cylindrical exterior surface 145, the diverter cam member second cylindrical exterior surface 161, the retainer member first cylindrical interior surface 195, and the retainer member first planar bearing surface 193. The diverter cam member cam portion 153 is disposed within the diverter chamber and underlies a portion of the diverter seal 33 to prevent that portion of the diverter seal from engaging the bearing member planar annular surface 129. The remainder of the diverter seal 33 overlies either the third series of openings 135, or the fourth series of openings 137, or both depending on the position of the cam portion 153 in the diverter chamber B. The third and fourth series of openings 135, 137 communicate respectively with the tub outlet 63 and the shower outlet 65 via the respective bearing member passageways 139, 141 and the seal adapter outlet passages 81, 83.

In the operation of the single handle mixing valve 11, temperature control is achieved with the handle 51, which rotates the control stem 27 and control disc 23 to admit hot and cold water into the mixing chamber A. Water admitted to the mixing chamber enters the diverter chamber B through the first and second openings 131, 133. The diverter lever 241 is rotated to select water flow from either the tub outlet 63 or the shower outlet 65. Thus when the diverter lever 241 is in the "up" position, as shown in FIG. 1, water is diverted through the shower outlet 65. In this position, water is prevented from entering the tub outlet 63 by the diverter seal 33 which is forced by the pressure of the water in the diverter chamber into sealing engagement with the bearing member planar annular surface 129, except where prevented by the cam portion 153. As the diverter lever 241 is rotated, the cam portion 153 slides under the diverter seal 33, thus permitting selection of either the tub outlet 63, the shower outlet 65, or an "off" position which is located between the third and fourth series of openings 135, 137. The range of motion of the diverter lever 241 is limited to 180° by the diverter lever stop surfaces 213. In addition, volume control from the tub or shower outlet can be achieved by positioning the cam portion 153 relative to the diverter seal 33 so as to close varying numbers of the openings of the third or fourth series of openings 135, 137.

The improved tub-shower diverter apparatus herein disclosed is advantageous in several respects. The cammed elastomeric washer working with a pierced annular planar surface within a diverter chamber is economical, durable and effective. The elastomeric washer is easily replaceable.

A series of openings to the respective tub-shower outlets can provide water volume control as well as water volume control that is wholly independent of temperature control. Prior art tub-shower single handle mixing valves such as that disclosed in U.S. Pat. No. 4,397,330 hereinabove mentioned provided hot-cold water mixing only, with no volume control. Prior art tub-shower two handle valves with a tub-shower diverter located in the tub spout provide water volume control, but not independent of temperature control. Since tub-shower valves are often located well above the tub upper extremity, the diverter control incorporated in the valve as herein disclosed is much more convenient to one standing in a tub than a diverter control incorporated in the tub spout would be.

Although in the preferred embodiment the tub-shower diverter of the present invention is incorporated in a tub-shower single handle mixing valve, it could also be utilized in some of its aspects with a two-handle tub-shower valve, or even separate from the tub-shower valve. In the embodiment shown, the openings 133, 135 in the diverter chamber planar annular surface 129 that communicate with the inlet water supply are two, which are oppositely disposed and centered on a diameter of the planar annular surface. However, these openings could be a single opening or multiple openings, and their particular arrangement is not critical. Further, it should be understood that the first series and second series of openings 135, 137 need not necessarily be oppositely disposed on a diameter of the diverter chamber planar annular surface, but could be disposed less than 180 degrees apart and separated by any circumferential distance along the planar annular surface that is sufficient to permit the diverter seal to perform the "on" and "off" and volume control functions.

The foregoing disclosure and the showings made in the drawings are merely illustrative of the principles of this invention and are not to be interpreted in a limiting sense.

I claim:

1. A tub-shower diverter comprising:
   a. a diverter chamber, diverter seal means, and diverter cam means;
      i. said diverter chamber comprising a planar annular surface pierced by first opening means that communicates with an inlet water supply, and by second and third opening means that communicate respectively with a tub outlet and a shower outlet, and with said first opening means being spaced radially from said second and third opening means;
      ii. said diverter seal means being disposed within said diverter chamber and being an elastomeric washer sized to overlay said second and third opening means, but not said first opening means;
      iii. said diverter cam means comprising a cam portion and a stem portion, with said cam portion disposed within said diverter chamber and underlying a portion of said elastomeric washer to prevent that portion from engaging said planar annular surface, with rotation of said stem portion permitting selection of the portion of said elastomeric washer that will not be engaged with said planar annular surface;
      iv. means for controlling the rotational position of said stem portion;
   whereby, pressure of water admitted to said diverter chamber from said inlet supply will force said elastomeric washer into sealing engagement with said planar annular surface except where prevented by said cam portion, so that either one or both of said second or third opening means may be selectively sealed.

2. A tub-shower single handle mixing valve and diverter comprising:
   a. a valve body having hot and cold water inlets communicating with hot and cold water inlet seals opening to a mixing chamber, a tub outlet, and a shower outlet;
   b. control means coacting with said inlet seals to control the flow of hot and cold water into said mixing chamber and including a rotatable control stem removably fixed to an operating handle means;
   c. diverter means comprising a diverter chamber, diverter seal means, and diverter cam means;
      i. said diverter chamber comprising a planar annular surface pierced by first opening means that communicates with said mixing chamber, and by second and third opening means that communicate respectively with said tub outlet and said shower outlet, and with said first opening means being spaced radially from said second and third opening means;
      ii. said diverter seal means disposed within said diverter chamber and being an elastomeric washer sized to overlay said second and third opening means but not said first opening means;

iii. said diverter cam means comprising a cam portion and a diverter stem portion, with said cam portion disposed within said diverter chamber and underlying a portion of said elastomeric washer to prevent that portion from engaging said planar annular surface, with said diverter stem portion being concentric with said rotatable control stem, with rotation of said diverter stem portion permitting selection of the portion of said elastomeric washer that will not be engaged with said planar annular surface;

iv. diverter lever means for controlling the rotational position of said diverter stem portion; whereby, pressure of water admitted to said diverter chamber from said mixing chamber will force said elastomeric washer into sealing engagement with said planar annular surface except where prevented by said cam portion, so that either one or both of said second or third opening means may be selectively sealed.

3. The device of claim 2 wherein said second and third opening means are oppositely disposed and are centered on a diameter of said planar annular surface.

4. The device of claim 3 wherein each of said second and third opening means comprises a plurality of openings any number of which may be selectively opened or closed by the positioning of said cam portion relative to said elastomeric washer to control the volume of water flow to the tub or shower.

5. The device of claim 4 wherein said diverter stem portion is disposed exteriorly of said rotatable control stem.

6. The device of claim 5 wherein said diverter chamber second and third opening means are disposed radially outwardly of said first opening means.

7. The device of claim 6 wherein:
a. said rotatable control stem is provided cylindrical exterior surfaces;
b. there is provided bearing means having interior and exterior cylindrical surfaces with said bearing means interior cylindrical surfaces being matingly received by said stem cylindrical exterior surfaces, and with said bearing means also incorporating said diverter means planar annular surface;
c. said diverter stem portion is provided interior and exterior cylindrical surfaces with said diverter stem portion interior cylindrical surfaces being matingly received by portions of said bearing means cylindrical exterior surfaces;
d. there is provided retainer means having interior and exterior cylindrical surfaces, with portions of said retainer means interior cylindrical surfaces being matingly received by portions of said diverter stem portion exterior cylindrical surfaces;
e. said valve body is provided a cylindrical interior surface which matingly receives said retainer means cylindrical exterior surface.

8. The device of claim 7 wherein said diverter chamber has wall surfaces comprising portions of said diverter means planar annular surface, portions of said bearing means cylindrical exterior surfaces, portions of said diverter stem portion exterior cylindrical surfaces, and portions of said retainer means interior cylindrical surfaces.

9. The device of claim 8 wherein said mixing chamber has wall surfaces comprising surfaces of said bearing means and said control means.

* * * * *